United States Patent [19]

Sherwood et al.

[11] Patent Number: 5,577,243
[45] Date of Patent: Nov. 19, 1996

[54] REALLOCATION OF RETURNED MEMORY BLOCKS SORTED IN PREDETERMINED SIZES AND ADDRESSED BY POINTER ADDRESSES IN A FREE MEMORY LIST

[75] Inventors: Gregory J. Sherwood; David W. Murphy, both of Lexington, Ky.

[73] Assignee: Lexmark International, Inc., Greenwich, Conn.

[21] Appl. No.: 221,420

[22] Filed: Mar. 31, 1994

[51] Int. Cl.$^6$ ................................................ G06F 12/02
[52] U.S. Cl. ...................... 395/607; 395/417; 395/419; 395/497.02; 364/281.1; 364/DIG. 1; 364/246.7
[58] Field of Search ........................... 364/282.2, 281.1, 364/246.7; 395/417, 419, 497.02, 600

[56] References Cited

U.S. PATENT DOCUMENTS

| | | | |
|---|---|---|---|
| 4,807,120 | 2/1989 | Courts | 395/425 |
| 5,109,336 | 4/1992 | Guenther et al. | 395/425 |
| 5,263,136 | 11/1993 | DeAguiar et al. | 395/164 |

OTHER PUBLICATIONS

IBM Technical Disclosure Bulletin, vol. 18, No. 8, Jan. 1976 New York, US, pp. 2582–2583, Anonymous, Space Reclamation in Virtual Storage Systems.

IBM Technical Disclosure Bulletin, vol. 28, No. 4, Sep. 1985 New York, US, pp. 1684–1686, Anonymous, Dynamic Storage Pool Manager.

Proceeding of the Texas Conference on Computing Systems, Nov. 17, 1975, Austin; US, pp. 2b–4.1–2b–4.6, Peterson, Dynamic storage allocation with buddy systems.

Information Processing 74—North–Holand Publishing Company, Aug. 5, 1974, Stockholm; SE, pp. 344, 348, Fenton et al., Dynamic storage allocation of arbitrary sized segments.

The "gmalloc" code of a public UNIX (trademark) source code. By Mike Harrtel, May 1989 pp. 1–9.

*Primary Examiner*—Frank J. Asta
*Attorney, Agent, or Firm*—John A. Brady

[57] ABSTRACT

In an electronic data processing apparatus blocks of returned memory 3 are linked by address pointers starting with a pointer in a table 1. Each pointer in the table 1 points to memory of within a predetermined size range varying by integral powers of 2. The memory blocks pointed to by each table pointer are sorted in order of size (alternately by frequency of use). Searching for memory of size needed is very efficient as it is limited to memory blocks within a size range. Additionally, returned memory blocks (7) of the same size as a block 3 are not in the sort list, but are pointed to by the block 3 of the same size and are used when that size block is selected.

23 Claims, 2 Drawing Sheets

REALLOCATION OF RETURNED MEMORY BLOCKS SORTED IN PREDETERMINED SIZES AND ADDRESSED BY POINTER ADDRESSES IN A FREE MEMORY LIST

TECHNICAL FIELD

This invention relates to electronic data processing with addressable memory which is freed for use during operation, and more specifically apparatus controlled by such electronic data processor in which such returned memory is located for reuse.

BACKGROUND OF THE INVENTION

During normal use of electronic data processing equipment electronic memory which has been used is freed for reuse. Such blocks of memory typically are of a wide variation of sizes and in a wide variation of locations. Although patterns of sizes for such returned memory and their locations can be predicted broadly for individual applications, this information is far from being precise enough for direct use to once again use the returned memory.

Prior to this invention such returned memory has been sorted by some category, such as by size or by order of addresses, and located for reuse by searching through such a sort. U.S. Pat. No. 5,109,336 to Guenther et al discloses such retrieval of memory. In this patent blocks of memory of different, predetermined sizes are disclosed as allocated by the program being executed. Returned memory of such sizes are added to these allocations. Where the allocated memory is not used, all other returned memory is searched in the order in which it has been sorted. This invention does not employ such allocated blocks of memory and limits the search through sorted returned memory in a manner to be described below.

This invention employs address pointers to achieve improved retrieval of returned memory. The use of such pointers per se is widely conventional. U.S. Pat. No. 4,807,120 to Courts discloses the use of pointers in a system not particularly similar to this invention except that it is for memory management with respect to returned memory.

The preferred embodiment of this invention categorizes returned memory according to sizes which vary by a single integer of powers of 2. The "gmalloc" code of a public UNIX (trademark) source code listing allocates memory to block differing by such powers of 2. However, these allocations are not related to returned memory in any manner similar to this invention since the allocations do not involve memory returned after the allocations.

Contemporary computer design employs a working memory space generally referred to as the "heap" or "free memory." The memory manager function of the data processor is given control of this typically large memory space, and it responds to program requests for memory blocks by identifying or creating an appropriate block and giving control of it to the requester in a process known as allocation. When the active program is done with a given memory block, a process known as "freeing," it relinquishes control of it to the memory manager. The memory manager will then store the block in some form from which it can be retrieved for other use in the same or different program at a later time.

Traditionally, memory managers must sacrifice memory usage efficiency for performance. Since the performance cost of sorting memory blocks in those systems is too great, comprehensive searches or intelligent allocation strategies are not practical. Subsequently, their searches will often encounter numerous blocks that are too small to be useful, forcing the program designer to either carve the desired size off of the first free block encountered that is large enough to fill the request or use a limited number of allowed block sizes and waste the difference between the size needed and the size provided. Although this approach is generally successful in systems with a low to moderate memory utilization ratio, systems requiring higher memory utilization cannot afford the waste. In these environments, such systems can expend significant search effort and may exhibit undesirable fragmentation patterns leading to premature "memory full" conditions. When fragmentation becomes severe, it is not uncommon for "out of memory" failures to occur even though 10 times the requested memory or more is available.

This invention requires more initial computational overhead than simple, unordered systems, but quickly makes up the deficit in searches involving more than a very few returned memory blocks. Further, its unique approach is designed to allow elaborate allocation strategies and other memory enhancements that were otherwise performance prohibitive in memory systems suffering from "fragmentation."

DISCLOSURE OF THE INVENTION

In accordance with this invention a call for memory is made by addressing a single word assigned to memory of the size range encompassing the memory required. That single word contains an address pointer to a sorted list of memory blocks of sizes within the size range assigned to that address. Preferably the list is sorted by size from largest to smallest and the single address pointer is the address of the largest memory block of that sorted list. Each entry in the sorted list contains a pointer to the next entry in the sorted list, as well as containing data defining the memory size and other such routine data describing that block of memory. The pointer assigned to memory size is employed as the address to examine the first memory block in the list, and that and the subsequent memory blocks pointed to are examined until the data processor determines that one memory block addressed contains memory of size greater (or less) than that sought and the next memory block addressed contains memory of size less (or more) than that sought (variations include stopping at sizes twice as large on the assumption that the remaining memory taken from that will be sought again by the same program being executed; another variation is sorting by frequency of use). Returned memory is sorted into the list for the size range of that memory. Preferably the size ranges differ by integral powers of 2, and therefore size category of returned memory is determined by simple shifting of binary data defining the size and counting the shifts to reach a numerical zero.

When memory is needed during the current program, only blocks of memory within the predetermined range of that needed are searched. Additionally, memory blocks the same size or within a close range of size are not included in the sort, but are pointed to by a second pointer address within the one of that size range reached by examining the sort. When that block is used, the pointer in that block identifies a next block to replace the first block in the sorted list. Accordingly, in the typical search, only one block of returned memory of close to each size is examined.

BRIEF DESCRIPTION OF THE DRAWING

The details of this invention will be described in connection with the accompanying drawing in which.

BEST MODE FOR CARRYING OUT THE INVENTION

Standard terminology for data processing control code to carry out limited, repetitive function is a routine. Such terminology will be used here to mean control code to program the data processing operation to perform a stated function. Routines are activated (typical terminology: called) typically by another routine addressing the initial code in the routine.

In this application a pointer is said to reach another address when by the data processor addressing the address pointed to it finds the reached address or it finds a pointer which is to the reached address or to an address having a pointer which similarly either points to the reached address or other pointer which ultimately leads to the reached address.

This embodiment employs standard data processing addresses, which are in digital codes and standard electronic memory addressing using such addresses. These are highly conventional and therefore will not be described in further detail. Pointers are such digital codes operated on as an address to relate a current address to an address which may be widely separated from the pointer address.

An actual implementation operates on 32 bit words, which means that each address specifies 32 bits and reference to size of memory by number is by number of 32 bit words. (Alternative words sizes, specifically 16 bit words, are equally preferred)

This preferred implementation is designed to address three characteristics of memory usage, found particularly in applications such as printers: relatively large heap size; potentially severe fragmentation effects; and significant performance and resource limitations.

Figure 1:
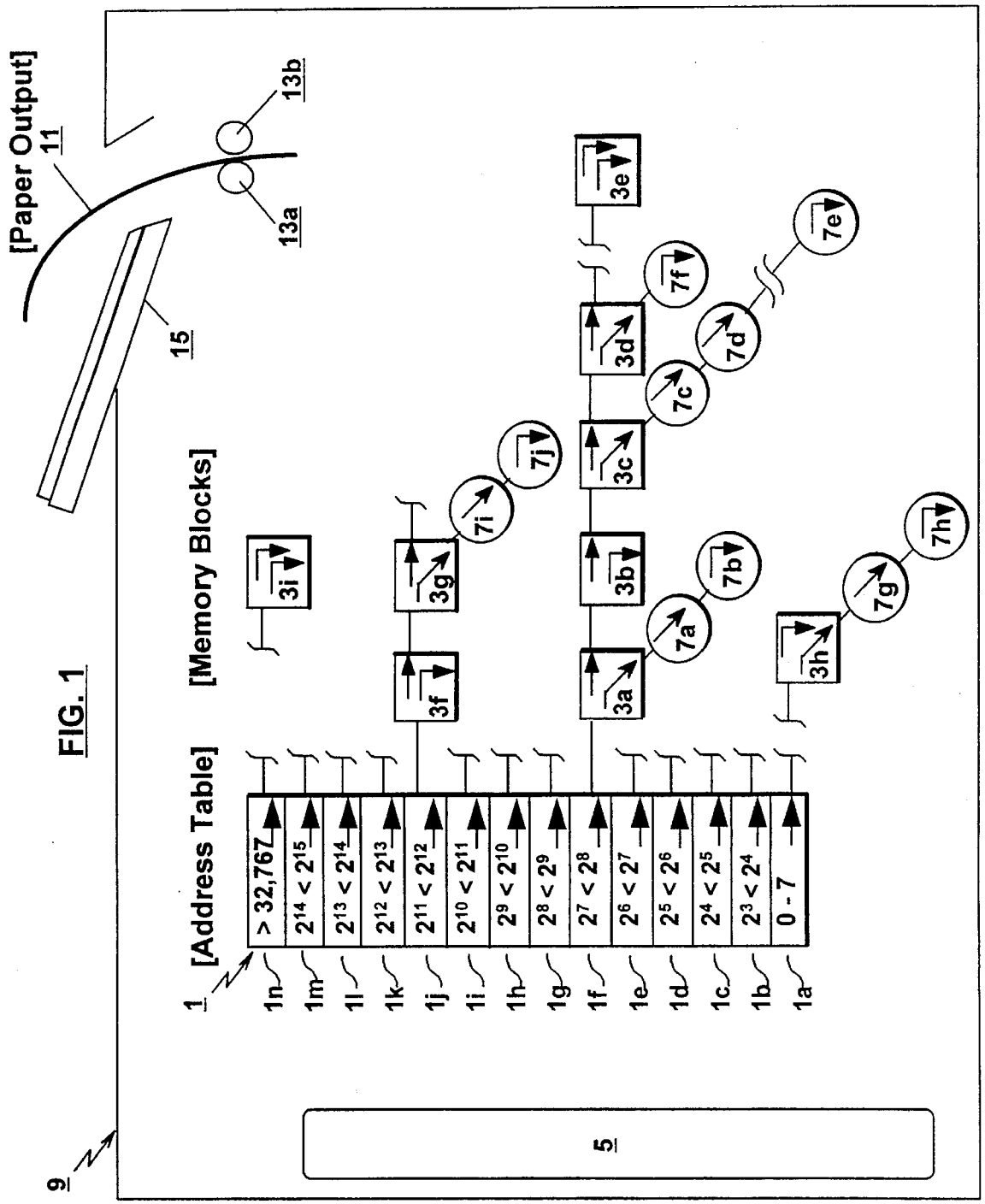
FIG. 1 is illustrative of the apparatus supporting a printer and FIG. 2 is illustrative of data showing a distribution of memory sizes within logarithmic size categories.

As shown in FIG. 1, A first element of this implementation is a table of addresses 1 which represent where all free memory blocks are of size 0 to 7, 2 E n to 2 E n+1, where n are consecutive integers between 3 and 14, and equal and greater than 32,768. Each address in table 1 constitutes an address pointer for entry to a sorted list of return memory blocks within the size ranges of 0 to 7, 2 E n to 2 E n+1, and 32,768 and greater. Thus, address 1*a* in table 1 has a pointer which reaches all memory blocks of size 0 through 7; address 1*b* in table 1 has pointer which reaches all memory blocks of size 8 through 15; address 1*c* in table 1 has a pointer which reaches all memory blocks of size 16 through 31; address 1*d* in table 1 has a pointer which reaches all memory blocks of size 32 through 63; address 1*e* in table 1 has a pointer which reaches all memory blocks of size 64 through 127; address 1 fin table 1 has a pointer which reaches all memory blocks of size 128 through 255; address 1*g* in table 1 has a pointer which reaches all memory blocks of size 256 through 511; address 1*h* in table 1 has a pointer which reaches all memory blocks of size 572 through 1023; address 1*i* has a pointer which reaches all memory blocks of size 1023 through 2047; address 1*j* has a pointer which reaches all memory blocks of size 2048 through 4095; address 1*k* has a pointer which reaches all memory blocks of size 4096 through 8191; address 1L has a pointer which reaches all memory blocks of size 8192 through 16,383; address 1*m* has a pointer which reaches all memory blocks of size 16,284 through 32,767; address 1*n* has a pointer which reaches all memory blocks of size 32,768 and greater.

Table 1 with its pointers directed to memory of predetermined size may be termed a hash bin structure, the term "bin" referring to the separation of memory blocks into a continuum of different size ranges.

As shown in FIG. 1, each of the addresses in FIG. 1 are pointers which identify one memory block 3. Thus, address 1*f* is a pointer to memory block 3*a*, which is the largest block of free memory between 128 and 255 words in size. If there are smaller blocks of free memory greater in size than 128, a pointer at memory block 3*a* is an address to the next smaller size memory block 3*b*. If there is a still smaller memory block greater in size than 128, a pointer at memory block 3*b* is an address to the next smaller size memory block 3*c*. In a typical situation, there may be hundreds of free memory blocks in a given bin. The final block in a list has a zero pointer, which may be all zero bits, which is recognized as not pointing to another, small block, but instead signaling the end of the list. At most all of the memory blocks 3 in a given bin will be searched for a memory of the proper size, while the others are not searched, as the search is initiated by data processor 5 addressing the address in table 1 which constitutes the bin for memory containing blocks 3, 7 within the range of the memory sought by data processor 5. For example, when data processor 5 seeks free memory of size of 3000 words, the controlling routine for memory selection is data processor 5 addresses 1*j* in the table 1 list. Next, the controlling routine in data processor 5 executes as an address the pointer in 1*j* to reach the largest memory block 3*f* in the bin of 1*j*. Only a few returned memories 3, 7 are shown in FIG. 1 for illustration. Each list ends with a memory block having a zero pointer, 3*e*, 3*h* and 3*i* being illustrated for lists 1*f*, 1*a* and 1*n*.

It will be understood of course and is widely conventional that instructions or data accessed in sequence in a data processing routines may not necessarily be in such sequence in memory so long as the program code being executed is effective to reach the instructions and data in the required sequence. This can be true also of memory blocks, since the end of a numeric sequence of addresses to free memory might contain a linking instruction of some kind to another part of free memory. Typically, however, in this embodiment a block of memory is that memory which exists between two data processing address and their numeric intermediate addresses, and each block of returned memory contains data explicitly defining its size.

Similarly, a pointer address is not necessarily physically near the memory which it represents, since it can be associated with another address pointing to the actual block of memory. Typically, in this application, however, the pointer address for each block of free memory 3 physically occupies that memory, since it is otherwise unused. Similarly, data defining the size of that memory block 3 and other incidental information, including the "third dimension" pointer to be described immediately below, also physically occupy its memory block 3, since it is otherwise unused. The memory blocks 3 carry a pointer to the preceding memory block 3 for operating efficiency in backward searching, as is conventional.

The hash table 1 may be considered a first dimension of search, and the sorted memory blocks 3 from each bin of table 1 may be considered a second dimension of search. The search is further limited and made more efficient by taking more than one memory block 3 of the same size out of the sort list. Thus, as shown illustratively in FIG. 1 as round dots 7, memory blocks which are the same size, are not part of the blocks 3 in the sort list. Instead only one is in that list. For example block 3*a*, shown with two other blocks 7*a* and 7*b*.

Block 3a contains a second address pointer in a predetermined location, which is recognized as signaling that a block 7a, the same size as block 3a, exists. When block 3a is selected for use, the existence of the second pointer is determined by data processor 5. When the second pointer is found, the sort pointer to block 3b may be applied to block 7a and the second pointer to block 7b is not changed because another block 7b exists and is another block having the same size as blocks 3a and 7a. When no block exists of the same size, the second pointer is a zero pointer, which may be all zeros, and which is recognized as not pointing to another memory block 7. Such a zero pointer is suggested in FIG. 1 by a bent arrow pointing downward.

The memory blocks 7 may be Variable in number as illustrated by block 7c, and 7d and an additional number in the omitted part of the drawing to reach block 7e. The last block in the 1a list points to identical size blocks 7g and 7h, the last, 7h, having a zero pointer for that list. The first block used for system memory by data processor 5 is the next block 7, 7g in this instance. The remaining block 7, such a 7h is then used. The last block used is block 3.

This linkage of identical size memory blocks 7 while only one is contained in the sort list, may be expanded to grouping together blocks close in size. Nevertheless, this technique is particularly efficient for small ranges of sizes, such as 64 through 127, since all entries in that category can not vary more than 63 places in size. The same-size lists might be very large in this size range.

As is standard for extracting an item from a sorted list, the pointer to the extracted memory 3 is changed to a pointer to the next block in the list. Thus, where 3b is selected for use, the pointer in 3a is changed to a pointer to 3c, the block 3 of the next lower size remaining.

Where block 3c is selected, which does have a same-size block 7, the second pointer in 3c is changed to a pointer to 7d, and block 7c is released for use.

This preferred implementation is a printer 9. This is suggested by the exit of a printed page of paper 11 by feed rollers 13a, 13b onto an exit tray 15 for use as a finished page of text or graphics, or both. Returned memory is typically explicitly designated by the page preparation software. Thus, data processor 5 typically is explicitly informed that a certain memory block of a certain size at a certain address is no longer needed. This constitutes a return of such memory for reuse. Other techniques to return memory are known, such as counting the calls to a memory block and acting on the block as returned when count reaches zero. Virtually any method of designating or locating returned memory is consistent with this invention and forms no part of this invention, since this invention is to subsequently locating such returned memory with high speed and data processing efficiency.

Returned memory typically is given with a beginning and end address. In this embodiment, as is common, the size is explicitly contained in the header of the memory block as a binary number (the header being a portion of memory blocks reserved for associated data). That size number is then shifted in the direction of division by two until all digits are gone. The number of shifts defines the lower size of that memory block and it can not be larger than twice that size since in the natural binary system used, each column represents a significance of twice that of the preceding column. (Similarly, in an exponential numbering system, just the exponent can be used and the bins would vary with the size of integral powers of that base.)

If in searching the sorted list for a bin, the first block 3 is too small, then the remaining blocks in the sorted list will be too small. A routine then continues the search through the next largest, non-empty bin as described. When a block 3 is reached that is too small, or the end of the sorted list of a bin is reached, then a system is applied to choose from among the previously encountered blocks 3. In the preferred embodiment the next larger block, which is the closest usable memory in size to that sought, is used when it is a few words close to that sought in size. This preserves larger blocks. Since, in general, breaking up blocks to leave a block on the same size order will create blocks of useful size when the large-enough block 3 is not close in size, a block intermediately found to be twice the size will be used. The search is continued in the higher, non-empty bins, to find a block twice the size sought, from which part is used. The remaining portion of that block is treated as returned memory and included in memory located by the sort list for the bin for memory encompassing the size of that unused portion. The search preference in order is: exact size, a few words larger, double in size, larger than double, and then the first block encountered which was larger. (The address of that first block is stored when it was found, and the address of a double size block is stored while an exact-size and a few-words-larger block is searched for.)

The sort routine is conducted with each return of a memory block. The bin list is simply searched from one end with the size of each block 3 encountered compared to the size of the just-returned memory block. When the comparison changes from smaller to larger, the pointer in the larger block 3 is changed to point to the just-returned memory and the just-returned memory has a pointer added to it pointing to the smaller memory block 3. Also, as mentioned the backward pointers and the same size pointers are applied as discussed. If the new memory size is the same as an existing block 3, it is not added to the sort list, but is pointed to by the previous last memory in the same-size list.

ADVANTAGE AND SCOPE

Although this invention is likely to improve performance in a variety of computer environments, it is particularly well suited to handle some of the worst computer system memory management scenarios: randomly sized memory blocks: widely varying block lifetimes; and a relatively large main memory that tends to "run full." These are all characteristics of demanding applications, such as laser printer and multi-tasking memory usage. The strengths of this invention are its extreme search efficiency, its low storage overhead, the inherent availability of block size alternatives when an exact match does not exist, and the comprehensive ordering of free memory blocks. Furthermore, this invention is applicable to a wide range of electronic memory, including disk storage.

Figure 2:
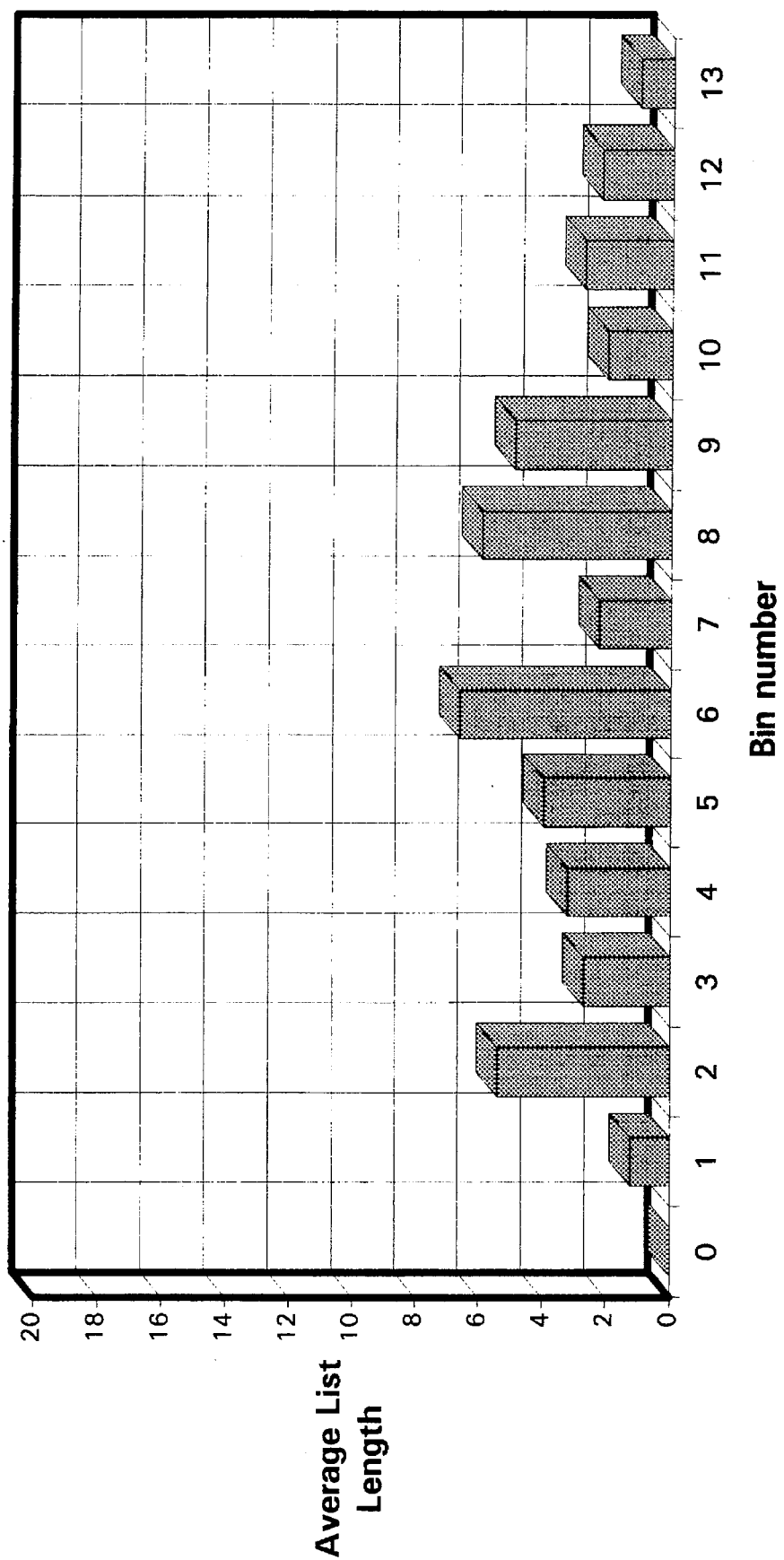

In order to provide search efficiency, the number of elements to be searched is reduced. Through grouping the blocks by size, the search is reduced by the immediate elimination of all groups roughly an order of magnitude smaller and larger than the block size sought by the data processor 5 (except for very small and very large blocks, which are grouped more broadly). Simple linear size grouping are not preferred since, for real applications, randomly sized block distributions have the general characteristic curve of the negative exponential function constant E minus x, where x is memory size. For this reason, the blocks would tend to be categorized into the same or a few bins. By contrast, the exponential definition of the bins of the preferred embodiment has the results of "flattening" the block distribution over the range of bins. FIG. 2 shows the average list lengths produced by printing a file for a PostScript (trademark) interpreter that required several thousand memory allocations with the intermediate bins defined exponentially as powers of 2 as described in the foregoing as the preferred embodiment. A somewhat leveled dispersion of the contents of the bins is apparent. Similarly, since the large bins contain blocks of large memory and the system memory is finite in size, they can not have a large number of blocks 3 in their sort list, since such a large amount of memory is simply unavailable. And the small bins can not contain more blocks than their total range, which is intrinsically limited.

In a test application for a printer, the bulk of the requests were for memory blocks no larger that 512 bytes in size and 97.8% of the requested memory blocks were from bins with a worst case search length of between 16 and 128 items in the sort.

Of course, actual search lengths are far less than these maximums. And, since the lists are ordered, the number of search steps required will statistically tend toward half the average length of the list being searched. A test case for a sophisticated printer generated an average search depth of 3.86 blocks 3 per search over the entire job.

Alternatively, for applications favoring certain memory sizes, the lists of blocks 3 need not be sorted by size and initially are not sorted at all. Instead, they are listed in order of returned, as is known for accessing memory prior to this invention. Thus, each time a certain size memory block is searched for and used, any duplicate size blocks of those used are moved to the front of the search list. Newly returned blocks along with their duplicates, if any exist, are inserted at the front of the search list. As searches are conducted, blocks of sizes more often used tend to move near the front of the list.

As another alternative for large lists, table 1 bin addresses can address a second table divided by size in intervals. Each element of that second table would have the address to a list of blocks 3 within the size of that second table element.

Other variations can be anticipated within the spirit and scope of this invention since it is not dependent upon the manner of addressing memory or determining the existence of free memory, and since wide variations in manner of listing and sorting memory blocks in the lists are acceptable. Similarly, the exponential (i.e., logarithmic to the base 2 in the preferred embodiment) distribution of bin sizes is an advantage but not essential to realizing other advantages as described of this invention.

We claim:

1. Apparatus comprising electronic data processing apparatus having reusable electronic memory blocks addressable by address codes, said data processing apparatus comprising: a list of different pointer addresses, a routine to determine the size of returned memory blocks as within predetermined size ranges, said memory blocks having sizes varying within the size of said predetermined size ranges, a routine to change the pointer address of or reached from said list, to reach each said returned memory block from an address in said list which reaches memory blocks within said predetermined size range determined for each said returned memory block, said predetermined size ranges reached from each pointer address of said list being a substantial continuum of sizes from small to large, a routine to address free memory by addressing one of said pointer addresses of said list which reaches memory of the size required and less than the size reached by other pointer addresses in said list, and a routine to compare the size of each said returned memory block to previous returned memory blocks and to eliminate more than one returned memory block of a predetermined close similarity of size from being reached by said pointer addresses when each said returned memory block is a predetermined close similarity of size to the size of an existing returned memory block and to apply a pointer address to said existing memory block reaching said returned memory block of said predetermined close similarity of size or to apply a pointer address to said returned memory block of said predetermined close similarity of size reaching said existing memory block.

2. The apparatus as in claim 1 in which said predetermined size ranges vary by single, integral powers of 2.

3. The apparatus as in claim 1 in which said data processing apparatus also comprises a routine to sort said returned memory block after said routine determines the size of one said returned memory block, said sort being with respect to other returned memory blocks reached by the pointer address which reaches said one returned memory block.

4. The apparatus as in claim 3 in which said routine to sort sorts and distributes said returned memory blocks by recent use.

5. The apparatus as in claim 3 in which said routine to sort sorts and distributes said returned memory blocks in order of size.

6. The apparatus as in claim 4 in which said apparatus comprises an imaging device controlled by said data processing apparatus.

7. The apparatus as in claim 5 in which said apparatus comprises an imaging device controlled by said data processing apparatus.

8. The apparatus as in claim 1 in which said apparatus comprises an imaging device controlled by said data processing apparatus.

9. The apparatus as in claim 2 in which said apparatus comprises an imaging device controlled by said data processing apparatus.

10. The apparatus as in claim 3 in which said apparatus comprises an imaging device controlled by said data processing apparatus.

11. Apparatus comprising electronic data processing apparatus having reusable electronic memory addressable by address codes, said data processing apparatus comprising a routine to compare the size of returned memory blocks to previously returned memory blocks to determine difference in size of said returned and said previously returned memory blocks within a predetermined close similarity of size, a routine to apply first address pointers to said returned memory blocks of size within said predetermined close similarity of size to reach each said returned memory blocks within said predetermined close similarity of size from said first address pointers, a routine to apply second address pointers to selected ones of said returned memory blocks to reach returned memory blocks of size differing from said predetermined close similarity of size, a routine to find returned memory blocks to be reused by addressing said second pointers, and a routine to reach a returned memory block within said predetermined close similarity of size by addressing a said first address pointer applied to said memory block reached by said routine addressing said second address printers, and a routine to apply a said second address pointer to selected ones of returned memory blocks within said predetermined close similarity of size to the size of the memory block found for reuse when said memory block found for reuse has a second address pointer or to apply a said first address pointer to selected ones of returned memory blocks within said predetermined close similarity of size to the size of the memory block found for reuse when said memory block found for reuse has a first address pointer.

12. The apparatus as in claim 11 in which said first pointers are applied to reach returned memory blocks which are a single size.

13. Apparatus comprising electronic data processing apparatus having reusable electronic memory blocks addressable by address codes, said data processing apparatus comprising: a list of different pointer addresses, a routine to determine the size of returned memory blocks as within predetermined size ranges, said memory blocks having sizes varying within the size of said predetermined size ranges, a routine to change the pointer address of or reached from said list, to reach each said returned memory block from an address in said list which reaches memory blocks within said predetermined size range determined for each said returned memory block, said predetermined size ranges reached from each pointer of said list varying in size by single, integral powers of 2 from $2^4$ to $2^{14}$, and a routine to address free memory by addressing one of said pointer addresses of said list which reaches memory of size required and less than the size reached by other pointer addresses in said list.

14. The apparatus as in claim 13 in which said data processing apparatus also comprises a routine to sort said returned memory block after said routine determines the size of one said returned memory block, said sort being with respect to other returned memory blocks reached by the pointer address which reaches said one returned memory block.

15. The apparatus as in claim 14 in which said routine to sort sorts and distributes said returned memory by recent use.

16. The apparatus as in claim 14 in which said routine to sort sorts and distributes said returned memory in order of size.

17. The apparatus as in claim 13 in which said data processing apparatus also comprises a routine to compare the size of each said returned memory block to previous returned memory blocks and to eliminate each said returned memory block from being sorted and distributed by said routine to sort when each said returned memory block is a predetermined close similarity of size to the size of an existing returned memory block and to apply a pointer address to said existing memory block to reach said returned memory block of said predetermined close similarity in size or to apply a pointer address to said returned memory block of said predetermined close similarity in size to reach said existing memory block.

18. The apparatus as in claim 7 which said apparatus comprises an imaging device controlled by said data processing apparatus.

19. The apparatus as in claim 13 in which said apparatus comprises an imaging device controlled by said data processing apparatus.

20. The apparatus as in claim 14 in which said apparatus comprises an imaging device controlled by said data processing apparatus.

21. The apparatus as in claim 15 in which said apparatus comprises an imaging device controlled by said data processing apparatus.

22. Apparatus comprising electronic data processing apparatus having reusable electronic memory blocks addressable by address codes, said data processing apparatus comprising: a list of different pointer addresses, a routine to determine the size of returned memory blocks as within predetermined size ranges, said memory blocks having sizes varying within the size of said predetermined size ranges, a routine to change the pointer address of or reached from said list, to reach each said returned memory block from an address in said list which reaches memory blocks within said predetermined size range determined for each said returned memory block, said predetermined size ranges reached from each pointer address of said list being a substantial continuum of sizes from small to large, and a routine to sort and distribute said memory blocks in order of size of said returned memory blocks, said sort and distribution being with respect to other returned memory blocks reached by the pointer address which reaches said returned memory block being sorted and distributed, and a routine to address free memory by addressing one of said pointer addresses of said list which reaches memory of the size required and less than the size reached by other pointer addresses in said list, said pointer addresses of said list first reaching memory blocks reached by each address in said list in order of largest to smallest.

23. The apparatus as in claim 22 in which said predetermined size ranges vary by single integral powers of 2.

* * * * *